Patented Apr. 7, 1931

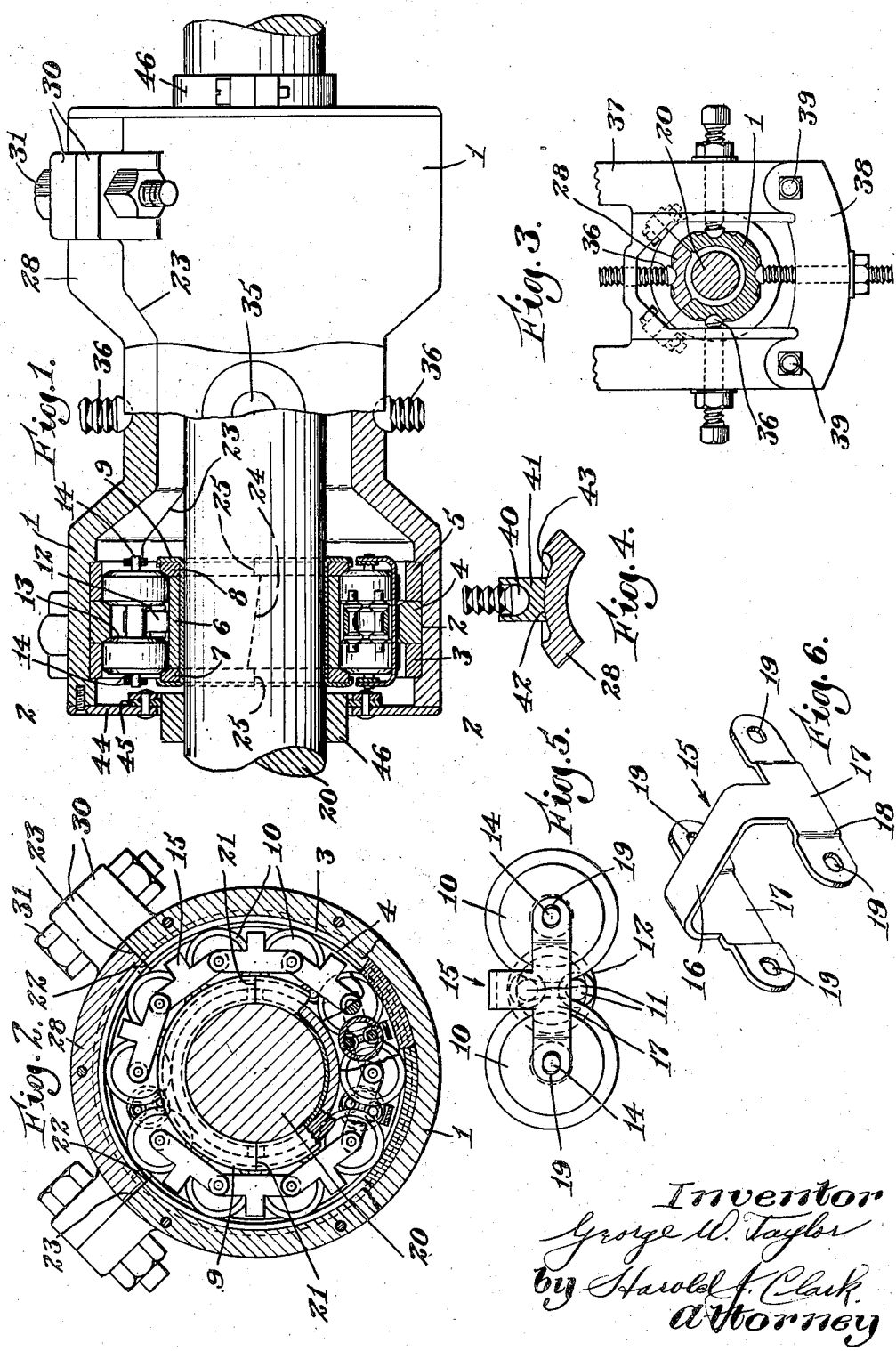

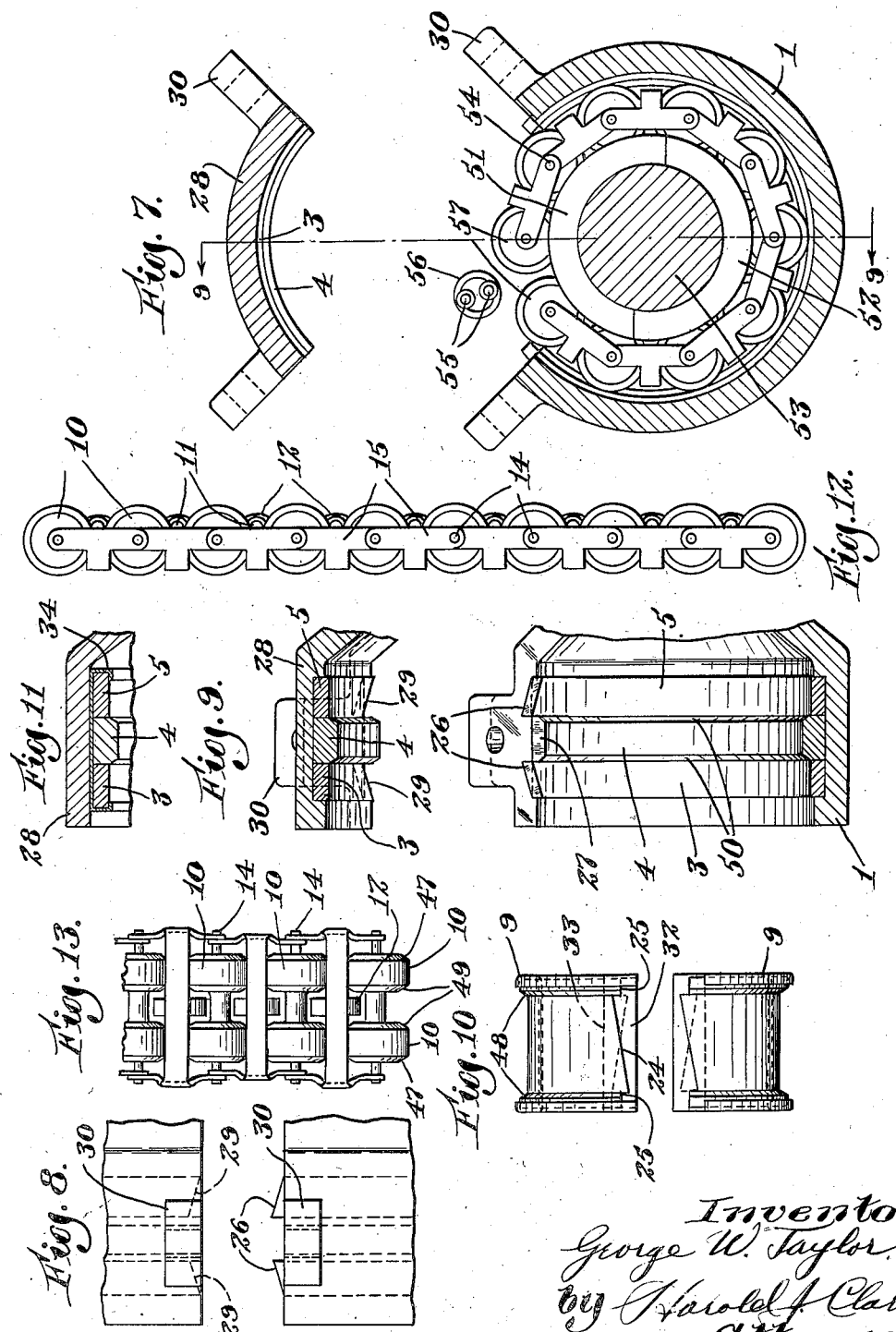

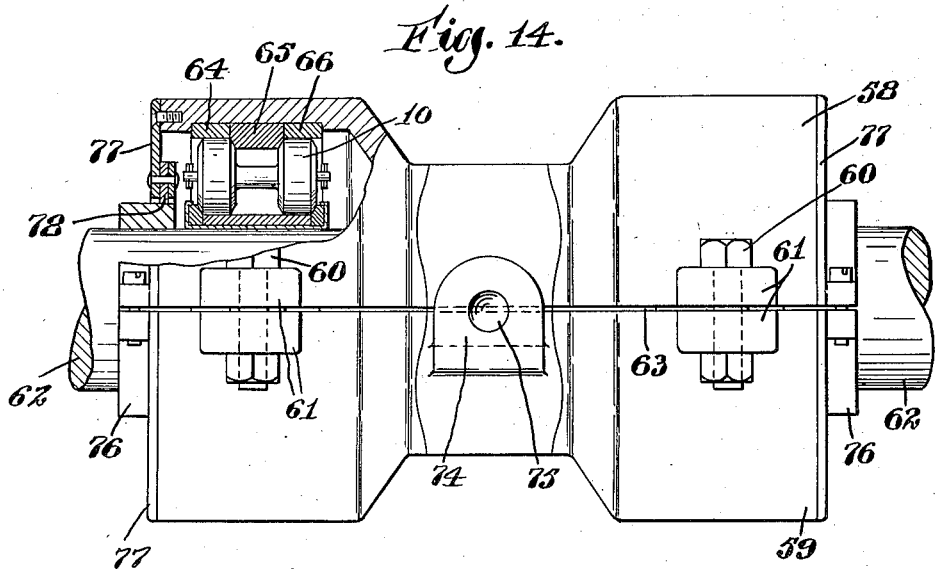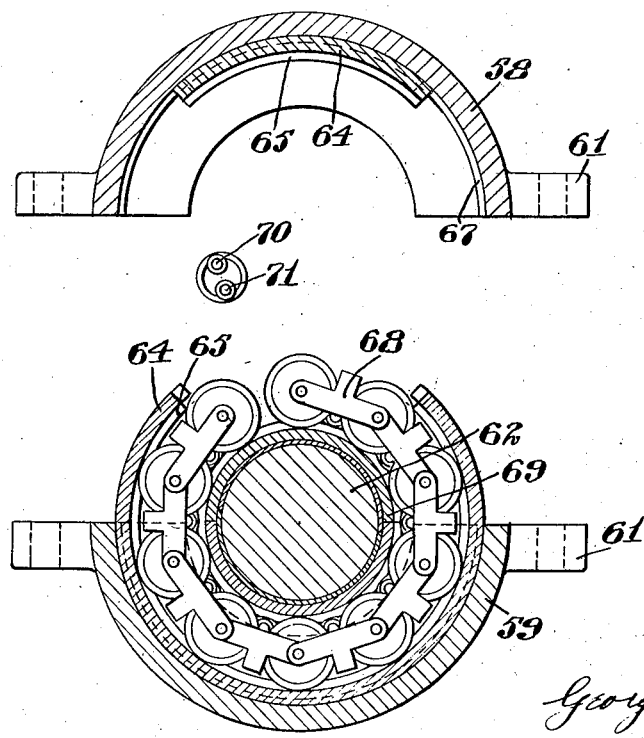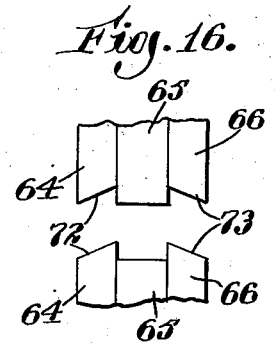

1,799,447

UNITED STATES PATENT OFFICE

GEORGE W. TAYLOR, OF WELLESLEY, MASSACHUSETTS, ASSIGNOR, BY MESNE ASSIGNMENTS, TO HAROLD J. CLARK, OF WATERTOWN, MASSACHUSETTS

SPLIT ROLLER BEARING

Application filed February 3, 1927. Serial No. 165,619.

My present invention is a novel and improved roller bearing, of the type illustrated and described in my prior and co-pending application, Serial No. 155,390, filed December 17, 1926, and is adapted for use in installations and applications where it is impractical to utilize an annular bearing.

While the bearing illustrated and described in my said co-pending application is applicable for axles, line shafting, and the like, there are many instances where the installation of such an annular bearing would render the use of such an annular bearing undesirable. To install annular bearings on line shafting, for example, requires a stripping of the entire shaft, which is obviously an undesirable feature.

To overcome this difficulty, therefore, I have devised my present novel bearing, permitting the installation of the same to any part of a line shafting or other otherwise inaccessible locations. To accomplish this desirable result I provide a roller bearing, having an inner and outer race, said races being split or separable into arcuate sections, said sectional races being united at the lines of separation in such manner as not to interfere with the efficient functioning of the rollers operating or working in the races.

So far as I am aware, I am the first in the art to have invented such a novel split bearing, and I have therefore claimed said bearing broadly herein.

A further feature of the present invention consists in the provision of a series of rollers, applicable for use in a roller bearing, said series of rollers being formed as a flexible chain or unit. In carrying out this phase of the invention, each pair of rollers is united by a link or clip, each link being separate from the link connecting succeeding rollers, thus permitting extreme flexibility of the series of rollers so connected. I preferably utilize a plurality of main supporting rollers, each supporting roller having a central groove therein, and each pair of main supporting rollers having interposed therebetween a pair of separating rollers, each pair of separating rollers being contained within a retaining ring, and having means to prevent end play or slippage of the separating rollers.

I believe that such a flexible unit of rollers is novel, and I have therefore claimed the same herein.

In the present application I have illustrated the application of my novel split bearing to a journal or housing for line shafting, constructing said housing for reception of my novel bearing.

I also preferably split the inner and outer races on lines of separation in such manner that the four lines of split or separation required will never be in alinement, although for certain applications of the bearings, such as in idler pulleys or the like, I may desire to split the bearing races into two equal or substantially equal halves, and for this reason do not desire to limit myself to the proportion of split illustrated in the present application.

In the application of the bearing of the present application to journal boxes for line shafting, for example, I prefer to split the outer race into sections of approximately three quarters and one quarter. In this way, the point of greatest strain in the bearing will have an unbroken surface throughout three quarters of the periphery of the outer ring, the greatest strain coming on the bottom and sides.

Further features of the invention, novel combinations of parts, details, and advantages, will be hereinafter more fully pointed out and claimed.

Referring to the drawings illustrating a preferred embodiment of the present invention, Fig. 1 is a side elevation of a journal box partly in section;

Fig. 2 is a cross sectional view on the line 2—2 of Fig. 1;

Fig. 3 is a vertical section showing the journal mounted in a hanger;

Fig. 4 is a cross sectional detail illustrating a modified form of locking means for the journal;

Fig. 5 is a side elevation of a pair of supporting rollers connected by the uniting or retaining clip;

Fig. 6 is a perspective of the retaining clip;

Fig. 7 is a cross sectional view illustrating the method of assembling the bearing and the journal housing;

Fig. 8 is a plan view illustrating the jointure between the sections;

Fig. 9 is a cross sectional view on the line 9—9 of Fig. 7 further illustrating the connection or joint between the outer race ring and housing;

Fig. 10 is a side elevation of the inner ring, illustrating the component parts of said ring;

Fig. 11 is a cross sectional detail illustrating the outer race when formed as a separate unit apart from the housing or containing member;

Fig. 12 is a side elevation of a plurality of rollers united in a flexible unit; and Fig. 13 is a top plan view of a section of the flexible unit of Fig. 12;

Fig. 14 is a side elevation, partly in section, of a different form of split journal;

Fig. 15 is a cross sectional view of the structure of Fig. 14 in position ready for assembling; and Fig. 16 is a detail of the outer race rings illustrating the form of joint therebetween.

As shown in the drawings I have applied my novel split bearing to a shaft journal 1, which journal is channelled, adjacent each end, at 2, if two bearing points in the journal are desired, otherwise the journal would be channelled at but one point. My novel split bearing comprises an outer race consisting of three rings 3, 4 and 5. The middle ring 4 extends above the surface of the rings 3 and 5 and is bevelled at its sides, as clearly illustrated. The inner race comprises three rings 6, 7 and 8, enclosed in a retaining cap 9. The inner sides of the outer rings 7 and 8 are likewise bevelled. Working in these concentric races are a plurality of main supporting rollers 10, and each pair of supporting rollers has therebetween a pair of separating rollers 11, confined in a retaining ring 12, which retaining ring extends into a groove 13 formed centrally of each supporting roller. The main supporting rollers as well as the separating rollers and retaining rings are substantially identical with the roller elements illustrated in my said copending application, Serial No. 155,390, with the exception that in the present instance each of the supporting rollers has a pair of hubs or pins 14 centrally of the outer sides of each roll. For ease in assembling the rollers in their bearing position, I preferably unite each pair of main supporting rollers and a pair of separating rollers by a clamp or clip 15. This clip 15 comprises a bridge piece 16 having depending T-arms 17. The outer ends of each of the arms 17 are bent inwardly slightly as illustrated at 18, and adjacent the outer end of each of the arms 17 is a recess or slot 19, in which slots 19 the hubs 14 of the rollers 10 are adapted to roll. The slots 19 are preferably of slightly greater size than the diameter of the hub 14, to reduce the friction between the hubs 14 and walls of the slots 19.

Figs. 5, 12 and 13 illustrate the uniting of the rollers by these clips, Figs. 12 and 13 illustrating very clearly the flexible roller unit resulting from such union. The inner bearing race is illustrated as fitted on a shaft 20, the race being preferably split as shown at 21, 21, into two halves, the halves of the race being sprung or fitted on to the shaft 20. The outer race is likewise split, but in the present instance I prefer to split the outer race at approximately the points illustrated at 22, 22. Thus, as clearly illustrated, there is an unbroken bearing surface from one point 22 throughout approximately three quarters of the circumference of the outer race, provding an unbroken bearing contact surface at the points where such contact is most important. In the present instance, as in line shafting, the main weight bears on the lower portion of the bearing, and hence the unbroken surface is provided at the most essential point. I have likewise illustrated the housing 1 as being split at 23, 23, the outer race rings 3, 4 and 5 being sprung into the groove 2 throughout approximately three quarters of the circumference of the housing, and likewise sprung into the one quarter fragment of the housing.

Since, in bearings of this type, it is desirable to have an even contact surface for the rollers, with no substantial break in the race surface, I split the inner race ring 6 along the line indicated at 24 in Fig. 1, viz., diagonally, so that when the rollers cross the line of break 24, they will do so gradually, and there will be no appreciable joint to interrupt the smooth surface over which the rollers travel. The outer rings 7 and 8 of the inner race are split on the lines 25, each of which is offset from the diagonal line of separation 24, so that the line of separation or joint, is not continuous throughout the width of the inner race. To accomplish a similar result in the outer race I extend the outer rings 3 and 5 beyond the joint 23 in the housing, these rings 3 and 5 being split at an angle, and projecting beyond the joint 23, as clearly shown at 26, the end 27 of the middle ring 4 being flush with the joint 23. The outer rings 3 and 5 in the portion 28 of the housing 1 are likewise split at an angle, as illustrated at 29, so that the section 28 of the housing 1 with the ring sections therein may be readily fitted on to the main housing and outer race portion. I may, if desired, split the housing 1 into two half sections, rather than on the proportion of three quarters to one quarter, while retaining the ratio of three quarters to one quarter split in the outer race, as will be more fully described.

The housing portions 1 and 28 are united in any suitable manner, as by lugs 30 and bolts 31, insuring firm positioning of the outer race rings at their lines of union.

As shown in Fig. 10, I preferably apply the cap or retaining sleeve 9 of the inner race in such manner that it will extend beyond the line of separation of the inner ring as shown at 32, on one side, and will consequently fall short of the line of separation on the opposite side, as at 33. On the other half of the inner race the cap or sleeve 9 will project beyond the line of separation on the side where it falls short of the line of separation on the opposite half of the inner race, and vice versa, so that the juncture of the cap or sleeve 9 will be in a different line than that of the juncture of the race rings.

I may desire to form the outer race as a unit separate from the housing enclosing the same. Thus, instead of channelling the housing to receive the outer rings 3, 4 and 5, I may provide a clamping or retaining cap or sleeve 34 for these rings, similar to the cap 9 for the inner race. In this structure, the bearing could be assembled as a unit, and slid into position within a solid housing, or could be utilized with a split housing with equal efficiency.

I may also desire to utilize, between the shaft 20 and the inner bearing race, an equalizer, to compensate for any misalinement, twist or varying size, in the shaft. The journal housing is provided with a plurality of drilled or rounded bearing surfaces 35, to receive the ends of lock screws 36, by means of which lock screws the housing is mounted in a hanger 37. The lower side 38, or bottom member of the hanger is hinged or pivotally connected at each end as shown at 39, 39, permitting ready installation or removal of the journal and bearing from the hanger after it is in position, or suspended from the overhead support by rods or the like, not shown. Thus, my entire novel journal, bearing, and component parts is adapted for installation in line shafting already in operation, without stripping the line shafting, as must be done with present forms of bearings.

In Fig. 4 is shown a modified form of lock screw 40, provided with a socket member 41 having a curved lower face 42 to fit closely the rounded surface 43 of the housing, and adapted to permit free movement of the housing relative to the socket member 41 to permit the housing to accommodate itself to any unevenness or crookedness in the shafting, although such crookedness or unevenness would be largely if not entirely taken care of by the equalizer shown in my said co-pending application.

The journal housing has end plates 44 which are secured in position after the assembled bearings are positioned in the housing, these plates 44 being provided with gaskets 45 fitting snugly against thrust collars 46 on the shaft 20.

It will be appreciated that the action and function of the race rings, inner and outer, and the rollers, is the same as thoroughly described in my co-pending application on the annular bearing Serial No. 155,390, and for this reason I will not go into detail as to the roller structures. However, it will be appreciated that the outer bevel edges 47 of the main supporting rollers cooperate with the bevel edges 48 of the outer rings on the inner race, and the inner bevel edges 49 on the rollers 10 cooperate with the bevel edges 50 on the inner ring 4 of the outer race, in such manner that shocks, forces, radial or axial thrusts are dissipated throughout the bearing, passing as they do from one bevel edge 48 of the inner race through approximately one third of the main supporting roller to one bevel edge 50, across the ring 4 and from the other bevel edge 50 to the outer bevel edge 48 of the inner race. Friction, and hence wear, are reduced to a minimum in my novel bearing.

In Fig. 7 is illustrated the method of assembling my novel split bearing in a journal housing for line shafting, although it will be appreciated that the same method and similar structure may be utilized for other purposes. In said Fig. 7 the half sections of the inner race, designated generally at 51 and 52, have been snapped together or assembled around a shaft 53. The chain of united rollers, designated generally as 54, is then fed between the inner race sections 51 and 52 and the three quarter section 1 of the housing, having the outer race rings therein. To complete the roller bearing assembly, the last unit of separating rollers, comprising the pair of rollers 55 and their retaining ring 56, are snapped or sprung between the two end rollers 57 of the chain 51. With the addition of this last unit of separating rollers and ring, the roller bearing element is complete and fills the spaces between the races without any play or looseness. The quarter section 28 of the housing, having the quarter sections of the outer races therein, is then placed over the thus assembled bearing and housing and secured in place by means of the bolts 31 or in any suitable or desirable manner, as illustrated in Fig. 2. When thus assembled, the contacting ends of the outer race rings 3, 4 and 5 will meet in a flush even joint, so that there will be no interruption or obstruction to the passage of the rollers thereover.

In Figs. 14 and 15 is shown another form of housing, and one which is equally if not more efficient than those heretofore described, as well as being simpler and more economical to manufacture. In this form the housing is constructed in two substantially equal halves 58 and 59 united by bolts 60 passing through lugs 61 on the half sections. The journal is illustrated as mounted on shaft 62, and is divided along the line illustrated at 63. From the manufacturing standpoint, it will be much simpler to make the housing sections 58 and 59 as shown in these Figs. 14 and 15, as the channels for receiving the outer race rings 64, 65 and 66 can obviously be more easily formed in a half housing than in a three quarter housing. Also, this present form has a further advantage in that none of the lines of split are opposite the lines of split in the adjacent members comprising the bearing and housing. In other words, each line of split or joint, in the inner race, outer race, and housing, are presented to an unbroken surface in the race or journal next thereto. Thus, as shown in Fig. 15, the outer race rings extend beyond or above the channel in the lower half section 59 a considerable distance, whereas the outer race rings in the upper half section 58 occupy but a part of the channel 67 in which said rings fit. Thus, when the flexible roller chain 68 is inserted between the inner race 69 and outer race, the last unit of separating rollers 70 and their retaining ring 71 is snapped or sprung into position and the upper half section with the smaller portions of the race rings are then ready to be assembled. On being assembled with the lower section, the ends of the rings 64, 65 and 66 will meet, and by means of the bolts 60 through the lugs 61 the housing can be joined to the point where the outer race rings meet in a flush joint. Fig. 16 illustrates the method in which these outer rings are formed, the ring 64 being formed at the joining edges at an angle as illustrated at 72, and the ends of the ring 66 being formed at an angle as illustrated at 73. The ends of the ring 65 are formed with a straight lateral cut, as the rollers do not ride or roll on the surface of this ring 65. When the housing is assembled the edges 72 and 73 will meet in a flush closed joint and thus will not interfere with or interrupt the passage of the rollers thereover. In order to provide for the holding of the housing sections by the hanger screws, I may form a lug 74 on each section, one extending from the bottom half over the line of split to the upper half, and the other extending from the upper half over the line of split to the lower half. A suitable surface or recess 75 to receive the usual hanger screws is provided in the lug 74. Thrust collars 76 are also provided, as well as the end plates 77 and gaskets or washers 78.

The form of housing and bearing just described is simple to manufacture, easy to install, and readily removable and separable in case of possible breakage or damage.

While I have necessarily described my present invention somewhat in detail, it will be appreciated that I may vary the size, shape, and arrangement of parts, within reasonably wide limits, without departing from the spirit of the invention.

My invention is further described and defined in the form of claims as follows:—

1. In a roller bearing of the kind described, an outer race comprising a plurality of rings, separated along irregular longitudinal lines, an inner race comprising a plurality of rings separated along irregular longitudinal lines, the abutting ends in the rings of each race being constructed and arranged to provide a divided uninterrupted bearing surface.

2. In a roller bearing of the kind described, an outer race comprising a plurality of rings, separated along irregular longitudinal lines, an inner race comprising a plurality of rings separated along irregular lines, the abutting ends in the rings of each race being constructed and arranged to provide an uninterrupted bearing surface, said races having parallel opposed bearing surfaces, a plurality of supporting rollers rolling on the parallel opposed bearing surfaces of said races, a pair of separating rollers between each pair of supporting rollers, each of said supporting rollers being formed with a groove centrally thereof, the edges of the rollers adjacent said groove being bevelled, and one of the rings in the outer race projecting into said groove and having bevelled edges to cooperate with the said bevelled edges of the supporting rollers, said supporting rollers also having their outer ends bevelled, the outer rings of the inner race projecting above the bearing surface of the race and being bevelled to cooperate with the outer bevelled edges of the supporting rollers.

3. In a roller bearing for shafting, an inner race, an outer race, a housing, a series of rollers working in said races, and means to permit partial rotation of said housing around said shaft.

4. A device of the kind described, comprising a plurality of supporting rollers, each pair of supporting rollers being pivotally united by a removable clip, whereby a flexible roller bearing element is produced.

5. A device of the kind described, comprising a series of supporting rollers, each of said rollers having a central projection at each end thereof, and each roller being connected to its adjacent roller by a removable retaining clip.

6. A device of the kind described, comprising a series of supporting rollers, each of said rollers having a fixed central projection at each end thereof, and each roller being connected to its adjacent roller by a removable retaining clip, each of said clips being separable from the adjacent clip.

7. A device of the kind described, comprising a series of supporting rollers, each of said rollers having a fixed central projection at each end thereof, and each roller being connected to its adjacent roller by a removable retaining clip, each of said clips being separable from the adjacent clip, and each of said clips being formed with elongated apertures to receive said central projections.

8. A device of the kind described, comprising a series of supporting rollers, each of said rollers having an integral central projection at each end thereof, each roller being connected to its adjacent roller by a removable retaining clip, each of said clips being separable from the adjacent clip, and each of said clips being formed with apertures to receive said integral central projections.

9. A removable retaining clip of the kind described, comprising a body portion, arms depending from said body portion and having apertures in their ends.

10. A retaining clip of the kind described, comprising a body portion, T-shaped arms depending from said body portion, the ends of said arms being in a different plane from the main portion of said arms and having apertures therein.

11. A removable retaining clip of the kind described, comprising a pair of connecting links formed with elongated races adjacent to their ends, the portions of the links containing said races being offset from the rest of the links.

12. A removable retaining clip of the kind described, comprising a pair of connecting links formed with elongated races adjacent to their ends, the portions of the links containing said races being offset from the rest of the links, and a U-shaped bridge connecting said links.

13. A removable retaining clip of flexible metal, comprising a pair of connecting links having elongated races adjacent to their ends, the portions of said links having said races therein being offset from the rest of the links, and a substantially U-shaped bridge uniting said links, said links being bendable relatively to said bridge.

14. A removable retaining clip of flexible metal, comprising a pair of connecting links having races adjacent to their ends, and a substantially U-shaped bridge uniting said links, said links being bendable relatively to said bridge.

15. In a roller bearing of the kind described, an outer race separated along irregular longitudinal lines, an inner race separated along irregular longitudinal lines, the abutting edges of the said races being constructed and arranged to provide an uninterrupted bearing surface, said races having parallel opposed bearing surfaces, a plurality of supporting rollers rolling on the parallel opposed bearing surfaces of said races, a pair of separating rollers between each pair of supporting rollers, each of said supporting rollers being formed with a groove centrally thereof, the edges of the rollers adjacent to said groove being bevelled, a rib in said outer race projecting into said groove and having bevelled edges to cooperate with the said bevelled edges of the supporting rollers, said supporting rollers also having their outer ends bevelled, and flanges on the inner race projecting above the bearing surface of said race and being bevelled to cooperate with the outer bevelled edges of the supporting rollers.

In testimony whereof, I have signed my name to this specification.

GEORGE W. TAYLOR.